United States Patent
Bretz et al.

(10) Patent No.: US 10,732,358 B2
(45) Date of Patent: Aug. 4, 2020

(54) ELECTRICAL-POLARITY SWITCHING HYBRID INTERFACE

(71) Applicant: COMMSCOPE TECHNOLOGIES LLC, Hickory, NC (US)

(72) Inventors: Dwight A. Bretz, Hummelstown, PA (US); Robert Charles Flaig, Lancaster, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/348,826

(22) PCT Filed: Nov. 8, 2017

(86) PCT No.: PCT/US2017/060613
§ 371 (c)(1),
(2) Date: May 9, 2019

(87) PCT Pub. No.: WO2018/089475
PCT Pub. Date: May 17, 2018

(65) Prior Publication Data
US 2019/0271812 A1    Sep. 5, 2019

Related U.S. Application Data

(60) Provisional application No. 62/419,516, filed on Nov. 9, 2016, provisional application No. 62/538,281, filed on Jul. 28, 2017.

(51) Int. Cl.
G02B 6/38        (2006.01)
H01R 24/64      (2011.01)
H01R 31/06      (2006.01)

(52) U.S. Cl.
CPC ............ *G02B 6/3817* (2013.01); *G02B 6/38* (2013.01); *G02B 6/3825* (2013.01);
(Continued)

(58) Field of Classification Search
CPC ...... G02B 6/3817; G02B 6/38; G02B 6/3897; G02B 6/3825; H01R 31/06; H01R 24/64
See application file for complete search history.

(56) References Cited

U.S. PATENT DOCUMENTS 3,775,727 A * 11/1973 Wise ...................... H01R 31/06
                                                              439/105
4,726,786 A *  2/1988 Hill ........................ H01R 31/06
                                                              439/504
(Continued)

FOREIGN PATENT DOCUMENTS

EP    1 199 587 A1    4/2002
GB    2 289 140 A1    11/1995
(Continued)

OTHER PUBLICATIONS

International Search Report and Written Opinion of the International Searching Authority for International Patent Application No. PCT/US2017/060613 dated Mar. 5, 2018, 13 pages.
(Continued)

*Primary Examiner* — Andrew Jordan
(74) *Attorney, Agent, or Firm* — Merchant & Gould P.C.

(57) ABSTRACT

A polarity switching hybrid interface is configured to couple both optical fibers and electrical conductors. The hybrid interface incorporates polarity switching circuitry such that the polarity of electrical contacts on a first side of the hybrid interface is opposite to the polarity of the electrical contacts on an opposite side of the hybrid interface. As such, the polarity of the electrical conductors coupled to each side of the hybrid interface need not be known. Each side of the hybrid interface is configured to interface with the same type of hybrid optical/electrical connector.

25 Claims, 9 Drawing Sheets

(52) U.S. Cl.
CPC .......... *G02B 6/3897* (2013.01); *H01R 24/64* (2013.01); *H01R 31/06* (2013.01)

(56) References Cited

U.S. PATENT DOCUMENTS

| | | | |
|---|---|---|---|
| 5,234,353 A | 8/1993 | Scholz et al. | |
| 5,268,983 A | 12/1993 | Tatarka et al. | |
| 5,317,663 A | 5/1994 | Beard et al. | |
| 5,419,717 A | 5/1995 | Abendschein et al. | |
| 5,473,715 A | 12/1995 | Schofield et al. | |
| 5,666,453 A | 9/1997 | Dannenmann | |
| 5,970,196 A | 10/1999 | Greveling et al. | |
| 5,997,358 A * | 12/1999 | Adriaenssens | H05K 1/0228 439/395 |
| 6,270,381 B1 * | 8/2001 | Adriaenssens | H01R 13/6467 333/1 |
| 6,367,984 B1 | 4/2002 | Stephenson et al. | |
| 6,464,520 B2 | 10/2002 | Saba | |
| 6,533,466 B1 | 3/2003 | Smith | |
| 6,543,941 B1 | 4/2003 | Lampert | |
| 6,588,938 B1 | 7/2003 | Lampert et al. | |
| 6,597,844 B1 | 7/2003 | Witt et al. | |
| 6,813,421 B2 | 11/2004 | Lail et al. | |
| 6,876,798 B2 | 4/2005 | Triplett et al. | |
| 6,963,118 B2 * | 11/2005 | Deliwala | B82Y 20/00 257/428 |
| 7,056,157 B2 * | 6/2006 | Herring | H01R 31/06 439/680 |
| 7,179,131 B2 * | 2/2007 | Caveney | H05K 1/0228 307/147 |
| 7,323,638 B1 * | 1/2008 | Radosavljevic | H01R 13/447 174/53 |
| 7,452,246 B2 * | 11/2008 | Caveney | H05K 1/0228 307/89 |
| 7,520,782 B1 * | 4/2009 | Huang | H01R 31/06 439/638 |
| 7,713,097 B2 * | 5/2010 | Eichhorst | H01R 31/06 439/721 |
| 7,722,258 B2 * | 5/2010 | Lu | G02B 6/3831 385/53 |
| 7,874,844 B1 * | 1/2011 | Fitts, Jr. | H01R 31/06 439/218 |
| 7,874,879 B2 * | 1/2011 | Caveney | H05K 1/0228 439/676 |
| 7,905,753 B2 * | 3/2011 | Siev | H01R 31/06 439/638 |
| 7,914,345 B2 * | 3/2011 | Bopp | H01R 13/6466 439/676 |
| 7,933,518 B2 * | 4/2011 | Li | H04B 10/40 398/137 |
| 8,128,294 B2 * | 3/2012 | Lu | G02B 6/3831 385/134 |
| 8,262,415 B2 * | 9/2012 | Caveney | H05K 1/0228 439/620.01 |
| 8,376,630 B2 * | 2/2013 | Wang | G02B 6/3817 385/139 |
| 8,467,654 B2 * | 6/2013 | Su | G02B 6/3817 385/139 |
| 8,475,055 B2 * | 7/2013 | Ciechomski | G02B 6/4475 385/101 |
| 8,480,312 B2 * | 7/2013 | Smith | G02B 6/3825 385/86 |
| 8,498,699 B2 * | 7/2013 | Wells | A61N 1/36017 607/3 |
| 8,509,422 B2 | 8/2013 | Wang et al. | |
| 8,550,850 B2 * | 10/2013 | Caveney | H05K 1/0228 439/620.1 |
| 8,601,289 B1 | 12/2013 | Smith | |
| 8,613,633 B2 * | 12/2013 | Pachon | H01R 13/6658 439/620.11 |
| 8,690,593 B2 * | 4/2014 | Anderson | G02B 6/3807 439/326 |
| 8,708,573 B2 * | 4/2014 | Gurreri | G02B 6/3873 385/58 |
| 8,761,564 B2 * | 6/2014 | Su | G02B 6/3817 385/139 |
| 8,794,849 B2 * | 8/2014 | Gurreri | G02B 6/3881 385/58 |
| 8,834,207 B2 * | 9/2014 | Caveney | H05K 1/0228 439/620.01 |
| 8,894,300 B2 * | 11/2014 | Smith | G02B 6/3817 385/86 |
| 8,905,647 B2 * | 12/2014 | Gurreri | G02B 6/26 385/58 |
| 8,961,031 B2 * | 2/2015 | Gurreri | G02B 6/3881 385/58 |
| 8,961,195 B2 * | 2/2015 | Wu | G02B 6/3817 439/607.01 |
| 8,974,126 B2 * | 3/2015 | Sloey | G02B 6/3817 385/93 |
| 9,104,001 B2 * | 8/2015 | Smith | G02B 6/4434 |
| 9,140,859 B2 * | 9/2015 | Anderson | G02B 6/3807 |
| 9,281,645 B2 * | 3/2016 | Dinnebier | H01R 13/44 |
| 9,417,399 B2 * | 8/2016 | Anderson | G02B 6/3893 |
| 9,459,411 B2 | 10/2016 | Smith et al. | |
| 9,531,128 B2 * | 12/2016 | Caveney | H05K 1/0228 |
| 9,625,649 B2 * | 4/2017 | Gurreri | G02B 6/36 |
| 9,632,255 B2 * | 4/2017 | Anderson | G02B 6/3895 |
| 9,658,409 B2 * | 5/2017 | Gniadek | G02B 6/3885 |
| 9,684,134 B2 * | 6/2017 | Anderson | G02B 6/3825 |
| 9,791,625 B2 * | 10/2017 | Gurreri | G02B 6/26 |
| 9,804,337 B2 * | 10/2017 | Anderson | G02B 6/3879 |
| 9,989,707 B2 * | 6/2018 | Smith | G02B 6/3825 |
| 10,048,446 B2 | 8/2018 | Kelly | |
| 10,061,090 B2 * | 8/2018 | Coenegracht | G02B 6/3878 |
| 10,088,636 B2 * | 10/2018 | Brandt | G02B 6/3879 |
| 10,312,607 B2 * | 6/2019 | Wilson | H01R 13/512 |
| 10,345,531 B2 * | 7/2019 | Smith | G02B 6/3825 |
| 10,361,508 B2 * | 7/2019 | Eslava | H01R 13/64 |
| 10,422,962 B2 * | 9/2019 | Coenegracht | G02B 6/3878 |
| 10,473,864 B2 * | 11/2019 | Anderson | G02B 6/3825 |
| 10,495,817 B2 * | 12/2019 | Gurreri | G02B 6/40 |
| 10,539,750 B2 * | 1/2020 | Gniadek | G02B 6/3895 |
| 2002/0058436 A1 * | 5/2002 | Saba | F02M 35/10222 439/191 |
| 2002/0137393 A1 * | 9/2002 | Herring | H01R 31/06 439/628 |
| 2003/0008564 A1 * | 1/2003 | Lebron | H01R 27/02 439/638 |
| 2003/0118295 A1 * | 6/2003 | Lail | G02B 6/4411 385/101 |
| 2003/0123822 A1 * | 7/2003 | Witt | G02B 6/4495 385/109 |
| 2005/0036750 A1 * | 2/2005 | Triplett | G02B 6/4495 385/100 |
| 2005/0181676 A1 * | 8/2005 | Caveney | H05K 1/0228 439/676 |
| 2007/0117469 A1 * | 5/2007 | Caveney | H01R 13/6466 439/676 |
| 2008/0273840 A1 * | 11/2008 | Lu | G02B 6/3831 385/72 |
| 2009/0022306 A1 * | 1/2009 | Wang | H04M 19/001 379/413 |
| 2009/0075523 A1 * | 3/2009 | Caveney | H05K 1/0228 439/676 |
| 2009/0214221 A1 | 8/2009 | Li et al. | |
| 2010/0035451 A1 * | 2/2010 | Eichhorst | H01R 31/06 439/224 |
| 2010/0041278 A1 * | 2/2010 | Bopp | H01R 13/6467 439/676 |
| 2010/0159752 A1 * | 6/2010 | Siev | H01R 31/06 439/676 |
| 2010/0296779 A1 | 11/2010 | Lu et al. | |
| 2011/0058774 A1 * | 3/2011 | Gurreri | G02B 6/3831 385/78 |
| 2011/0086549 A1 * | 4/2011 | Caveney | H05K 1/0228 439/620.01 |
| 2011/0172725 A1 * | 7/2011 | Wells | A61N 1/36017 607/3 |

(56) References Cited

U.S. PATENT DOCUMENTS

| | | | |
|---|---|---|---|
| 2011/0200286 A1* | 8/2011 | Smith | G02B 6/4434 385/86 |
| 2011/0222819 A1* | 9/2011 | Anderson | G02B 6/3895 385/78 |
| 2011/0235979 A1* | 9/2011 | Anderson | G02B 6/3895 385/78 |
| 2011/0243567 A1 | 10/2011 | Su et al. | |
| 2011/0255829 A1* | 10/2011 | Anderson | G02B 6/3879 385/60 |
| 2011/0262077 A1 | 10/2011 | Anderson et al. | |
| 2011/0311187 A1 | 12/2011 | Wang et al. | |
| 2012/0039571 A1 | 2/2012 | Ciechomski et al. | |
| 2012/0238153 A1* | 9/2012 | Pachon | H01R 13/6658 439/694 |
| 2012/0302104 A1 | 11/2012 | Wu | |
| 2012/0315000 A1* | 12/2012 | Gurreri | G02B 6/26 385/78 |
| 2012/0329326 A1* | 12/2012 | Caveney | H05K 1/0228 439/620.09 |
| 2013/0087690 A1* | 4/2013 | Sloey | G02B 6/3817 250/216 |
| 2013/0089290 A1 | 4/2013 | Sloey et al. | |
| 2013/0202254 A1 | 8/2013 | Gurreri et al. | |
| 2013/0251376 A1* | 9/2013 | Su | G02B 6/3817 398/130 |
| 2014/0023327 A1* | 1/2014 | Smith | G02B 6/3817 385/86 |
| 2014/0038461 A1* | 2/2014 | Caveney | H05K 1/0228 439/620.09 |
| 2014/0139175 A1* | 5/2014 | Gonzalez | F02N 11/12 320/101 |
| 2014/0219610 A1* | 8/2014 | Gurreri | G02B 6/40 385/58 |
| 2014/0233892 A1* | 8/2014 | Gurreri | G02B 6/40 385/59 |
| 2014/0286610 A1* | 9/2014 | Anderson | G02B 6/3807 385/76 |
| 2015/0004849 A1* | 1/2015 | Caveney | H05K 1/0228 439/676 |
| 2015/0079824 A1* | 3/2015 | Dinnebier | H01R 25/142 439/121 |
| 2015/0131944 A1* | 5/2015 | Gurreri | G02B 6/3881 385/72 |
| 2015/0153527 A1* | 6/2015 | Smith | G02B 6/3887 385/88 |
| 2016/0006178 A1* | 1/2016 | Gzybowski | H01R 13/465 439/491 |
| 2016/0041342 A1* | 2/2016 | Smith | G02B 6/3887 385/78 |
| 2016/0091669 A1 | 3/2016 | Bullock et al. | |
| 2016/0099521 A1* | 4/2016 | Gzybowski | H01R 24/28 439/489 |
| 2016/0131858 A1* | 5/2016 | Anderson | G02B 6/3879 385/78 |
| 2016/0259135 A1 | 9/2016 | Gniadek et al. | |
| 2017/0149177 A1* | 5/2017 | Gzybowski | H01R 13/641 |
| 2017/0160488 A1* | 6/2017 | Smith | G02B 6/3894 |
| 2017/0184798 A1 | 6/2017 | Coenegracht | |
| 2017/0254966 A1* | 9/2017 | Gniadek | G02B 6/3885 |
| 2017/0264045 A1* | 9/2017 | Eslava | H01R 13/6205 |
| 2017/0293087 A1* | 10/2017 | Anderson | G02B 6/3807 |
| 2017/0315301 A1* | 11/2017 | Kelly | G02B 6/38 |
| 2018/0031775 A1 | 2/2018 | Gurreri et al. | |
| 2018/0164504 A1* | 6/2018 | Gurreri | G02B 6/3873 |
| 2018/0284355 A1* | 10/2018 | Smith | G02B 6/3825 |
| 2019/0025523 A1* | 1/2019 | Coenegracht | G02B 6/3849 |
| 2019/0103686 A1* | 4/2019 | Wilson | H01R 31/065 |
| 2019/0107678 A1* | 4/2019 | Anderson | G02B 6/3825 |
| 2019/0271812 A1* | 9/2019 | Bretz | H01R 24/64 |
| 2019/0296503 A1* | 9/2019 | Gilliland | H01R 13/6616 |

FOREIGN PATENT DOCUMENTS

| | | |
|---|---|---|
| WO | 2013/117598 A2 | 8/2013 |
| WO | 2013/189370 A2 | 12/2013 |
| WO | 2014/126975 A1 | 8/2014 |
| WO | 2014/197103 A2 | 12/2014 |
| WO | 2016/063135 A2 | 4/2016 |
| WO | 2016/123124 A1 | 8/2016 |

OTHER PUBLICATIONS

"Cloudsplitter—Ethernet and Power Technology", TE Connectivity, 4 pages (2014).

"New product Development and Product advancement—At the speed of light, from Concept, Design, Tooling, Testing and Mass Production", SENKO Advanced Components, 40 pages (2014).

"Cloudsplitter Hybrid Fiber Power Concept", TE Connectivity, 4 pages (2014).

\* cited by examiner

ELECTRICAL-POLARITY SWITCHING HYBRID INTERFACE

CROSS-REFERENCE TO RELATED APPLICATIONS

This application is a National Stage Application of PCT/US2017/060613, filed on Nov. 8, 2017, which claims the benefit of U.S. Patent Application Ser. No. 62/419,516, filed on Nov. 9, 2016, and claims the benefit of U.S. Patent Application Ser. No. 62/538,281, filed on Jul. 28, 2017, the disclosures of which are incorporated herein by reference in their entireties. To the extent appropriate, a claim of priority is made to each of the above disclosed applications.

TECHNICAL FIELD

The present disclosure is directed to fiber optic and electrical interfaces and, more particularly, to a hybrid optical and electrical power interface with polarity switching.

BACKGROUND OF THE DISCLOSURE

In today's telecommunications market there is growing demand to support active devices such as fixed location transceivers for generating wireless communication coverages areas (e.g., Wi-Fi access points, macrocells, microcells, picocells, femtocells, other cell sizes, wireless hot spots, nodes, etc.), power-over-Ethernet extenders, and IP devices (e.g., digital cameras such as security cameras, computer devices, etc.). There is also a desire to support such devices with faster transmission rates, higher power and longer spans. To achieve faster transmission rates, it is desired to support such active devices using an optical fiber network. However, traditional fiber optic networks are generally passive (e.g., passive optical local area networks (POLAN), fiber-to-the-home (FTTH), fiber-to-the-desk (FTTD), fiber-to-the-node (FTTN), fiber-to-the-curb (FTTC) and other network architectures) and, therefore, do not provide ready access to power. Thus, there is a need to support active devices with both electrical power and optical signal and a need to integrate hybrid connectivity (e.g., both power and fiber optics) into existing fiber optic networks.

SUMMARY

The present disclosure is directed to various embodiments of a hybrid (optical and electrical) interface that has numerous applications including incorporation in a wall plate insert.

An aspect of the present disclosure is directed a hybrid wall plate insert that is configured for both electrical and fiber optic coupling. The hybrid wall plate insert is of a form factor enabling its insertion in a standard Ethernet-sized, e.g., RJ-45, wall plate opening. The hybrid wall plate insert accommodates an SC fiber optic connector for fiber optic coupling and provides electrical contacts for electrical coupling.

An aspect of the present disclosure is directed to a coupling device that includes a wall-plate-interfaceable, singular housing that houses both a fiber optic coupling device and an electrical coupling device.

An aspect of the present disclosure is directed to a coupling device having a housing that includes a first channel and a second channel, as well as a wall plate stop latch. The coupling device further includes a fiber optic coupling device that is contained within the first channel and an electrical coupling device that is contained within the second channel. The wall plate stop latch is configured to interface with a wall plate and stop insertion of the housing at a desired location.

An aspect of the present disclosure is directed to a method for establishing a hybrid wall plate, including: inserting a fiber optic coupling device into a singular housing; inserting an electrical coupling device into the singular housing; and inserting the housing into a connector opening in a wall plate.

An aspect of the present disclosure is directed to a telecommunications connection system that includes a wall plate and a connection module. The wall plate defines at least one port. The connection module mounts within the port. The connection module includes an optical connection interface and an electrical connection interface.

An aspect of the present disclosure is directed to a polarity switching hybrid interface that is configured to couple both optical fibers and electrical conductors. The hybrid interface incorporates polarity switching circuitry such that the polarity of electrical contacts on a first side of the hybrid interface is opposite to the polarity of the electrical contacts on an opposite side of the hybrid interface. As such, the polarity of the electrical conductors coupled to each side of the hybrid interface need not be known. Each side of the hybrid interface is configured to interface with the same type of hybrid optical/electrical connector.

An aspect of the present disclosure is directed to a hybrid optical/electrical interface that includes a housing a fiber optic coupler and an electrical conductor coupler. The electrical conductor includes a first pair of contacts that are electrically coupled to a second pair of contacts. The fiber optic coupler and the electrical conductor coupler define a first side of the housing with a first receptacle that is configured to receive a first fiber optic/electrical hybrid connector and the second side of the housing with a second receptacle that is configured to receive a same second fiber optic/electrical hybrid connectors. The electrical conductor includes circuitry that changes a polarity of the first pair of contacts to an opposite polarity at the second pair of contacts. In certain examples, a concentrated plurality of hybrid optical/electrical interfaces are provided at a panel, for example in a telecommunications connection system, for simplified of routing of optical fibers and electrical cables.

An aspect of the present disclosure is directed to a coupling device that includes a housing, a fiber optic coupling device and an electrical coupling device. The housing includes a first channel in which is housed the fiber optic coupling device. The housing includes a second channel in which is housed the electrical coupling device. The electrical coupling device includes a first pair of contacts electrically coupled to a second pair of contacts, and further includes circuitry that changes a polarity at the first pair of contacts to an opposite polarity at the second pair of contacts.

An aspect of the present disclosure is directed to a method of coupling a first optical/electrical hybrid connector to a second same optical/electrical hybrid connector. Each of the hybrid connectors is coupled to a respective hybrid cable having an optical fiber and a pair of electrical conductors. The method of coupling includes: (a) receiving the first hybrid connector into a first optical/electrical hybrid receptacle of a housing; and (b) receiving the second hybrid connector in a second optical/electrical hybrid receptacle of a housing. The first and second hybrid receptacles are both optically coupled and electrically coupled to one another. The electrical coupling changes an electrical polarity of the first optical/electrical hybrid receptacle to an opposite electrical polarity at the second optical/electrical hybrid receptacle.

An aspect of the present disclosure is directed to a hybrid coupling device having a housing that includes a first de-mateable side and a second de-mateable side. Each of the first and second de-mateable sides includes a receptacle having a fiber optic interface and an electrical interface. The electrical interface includes at least first and second contacts. The fiber optic interface of the first de-mateable side is optically coupled to the fiber optic interface of the second de-mateable side. The first contact of the electrical interface of the first de-mateable side is electrically coupled to the second contact of the electrical interface of the second de-mateable side and the second contact of the electrical interface of the first de-mateable side is electrically coupled to the first contact of the electrical interface of the second de-mateable side.

In certain examples a housing of the present disclosure is of a unitary configuration while in other examples a housing is of a multi-piece configuration.

In certain examples, a fiber optic coupling device of the present disclosure comprises an SC adapter while in other examples a fiber optic coupling device comprises an LC adapter.

In certain examples a fiber optic coupling device of the present disclosure optically couples connectors of ferruled optical fibers while in other examples a fiber optic coupling device optically couples connectors of ferrule-less optical fibers.

In certain examples, an electrical coupling device of the present disclosure comprises a pair of electrically conductive pins.

In certain examples, a pair of electrically conductive pins of the present disclosure are press-fit within the housing.

In certain examples, a pair of electrically conductive pins of the present disclosure are maintained within a pin insert that is housed within a housing.

In certain examples, a pair of electrically conductive pins of the present disclosure are press-fit into a pin insert while in other examples a pair of electrically conductive pins are molded into a pin insert.

In certain examples, each of a pair of electrically conductive pins of the present disclosure is individually molded.

In the certain examples, a pair of electrically conductive pins of the present disclosure are in a cross configuration while in other examples a pair of electrically conductive pins are in a straight configuration.

In certain examples, a pair of electrically conductive pins of the present disclosure are secured within a housing with an epoxy material.

In certain examples, a housing of the present disclosure has a form factor consistent with an RJ-45 wall plate connector.

In certain examples, a fiber optical coupler of the present disclosure includes an optical fiber alignment structure.

In certain examples, an alignment structure of the present disclosure is adapted to align optical fibers of ferruled connectors while in other examples an alignment structure is adapted to align optical fibers of ferrule-less connectors.

In certain examples, a fiber optical coupler of the present disclosure includes a ferrule alignment sleeve to align ferrules of optical connectors.

In certain examples, a fiber optic coupler of the present disclosure includes a port having a form factor compatible with a fiber optic connector.

In certain examples, a fiber optic connector of the present disclosure is a single fiber connector while in other examples a fiber optic connection is a multi-fiber connector.

In certain examples, a fiber optic connector of the present disclosure is an SC connector, an LC connector or an MPO connector.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A polarity switching hybrid interface is configured to couple both optical fibers and electrical conductors. The hybrid interface incorporates polarity switching circuitry such that the polarity of electrical contacts on a first side of the hybrid interface is opposite to the polarity of the electrical contacts on an opposite side of the hybrid interface. As such, the polarity of the electrical conductors coupled to each side of the hybrid interface need not be known. Each side of the hybrid interface is configured to interface with the same type of hybrid optical/electrical connector.

Figure 2:
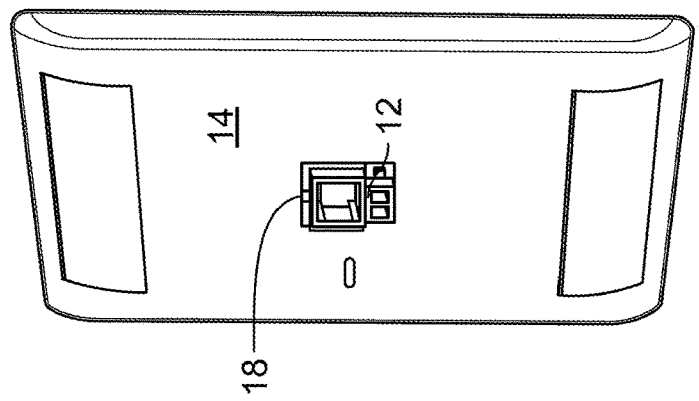
FIG. 2 is a perspective view of the wall plate and the polarity switching hybrid interface according to the present disclosure.
Figure 1:
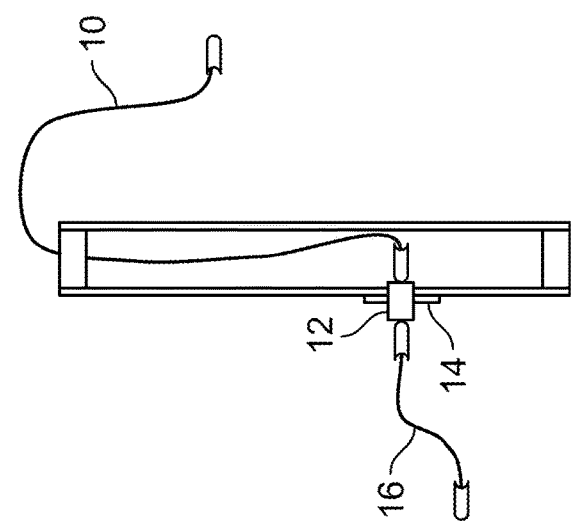
FIG. 1 is a cut-away of a structural wall illustrating the polarity switching hybrid interface of the present disclosure within a wall plate.

A polarity switching hybrid interface 12 of the present disclosure is illustrated in FIGS. 1 and 2 relative to a wall plate 14. In this example embodiment, the polarity switching hybrid interface 12 is configured to provide a stationary receptacle at the wall 15 for combined optical fiber and electrical coupling. Referring to FIG. 1, internal cabling 10, carrying both optical fiber and electrical wiring via combined or separate cables, is coupled to one side of the polarity switching hybrid interface 12. A consumer cable 16, carrying both optical fiber and electrical wiring via combined or separate cables, is coupled to opposite side of the polarity switching hybrid interface 12.

Figure 3:
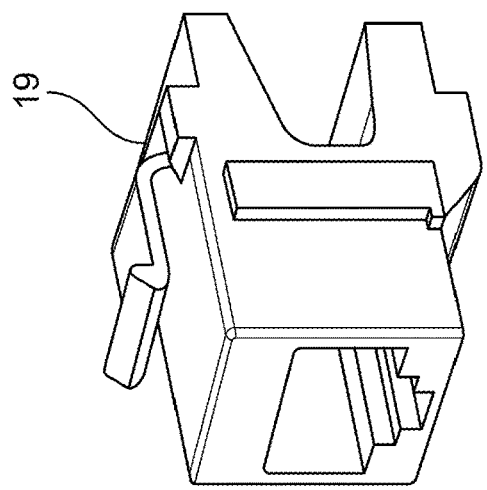
FIG. 3 is an illustration of an RJ-45 connector.

A more detailed view of the wall plate 14 is provided in FIG. 2. As shown, the wall plate 14 is a plate configured for attachment to a wall and typically covers an outlet box or other housing located within the wall. The wall plate 14 has an opening or port 18 having a form factor that is configured to accommodate a standard Ethernet RJ-45 connector, such as the RJ-45 connector 19 illustrated in FIG. 3. The polarity switching hybrid interface 12, which includes an optical connection interface (or optical interface) and an electrical connection interface (or electrical interface), is designed with the same form factor as the RJ-45 connector and is therefore capable of interfacing with the wall plate 14 without modification to the wall plate 14. In certain examples, the wall plate 14 includes a plurality of ports 18. The polarity switching hybrid interface 12 is configured to be mateable/de-mateable with independent optical fiber connectors and independent electrical connectors and/or configured to be mateable/demateable with a hybrid optical/electrical connector.

Figure 4:
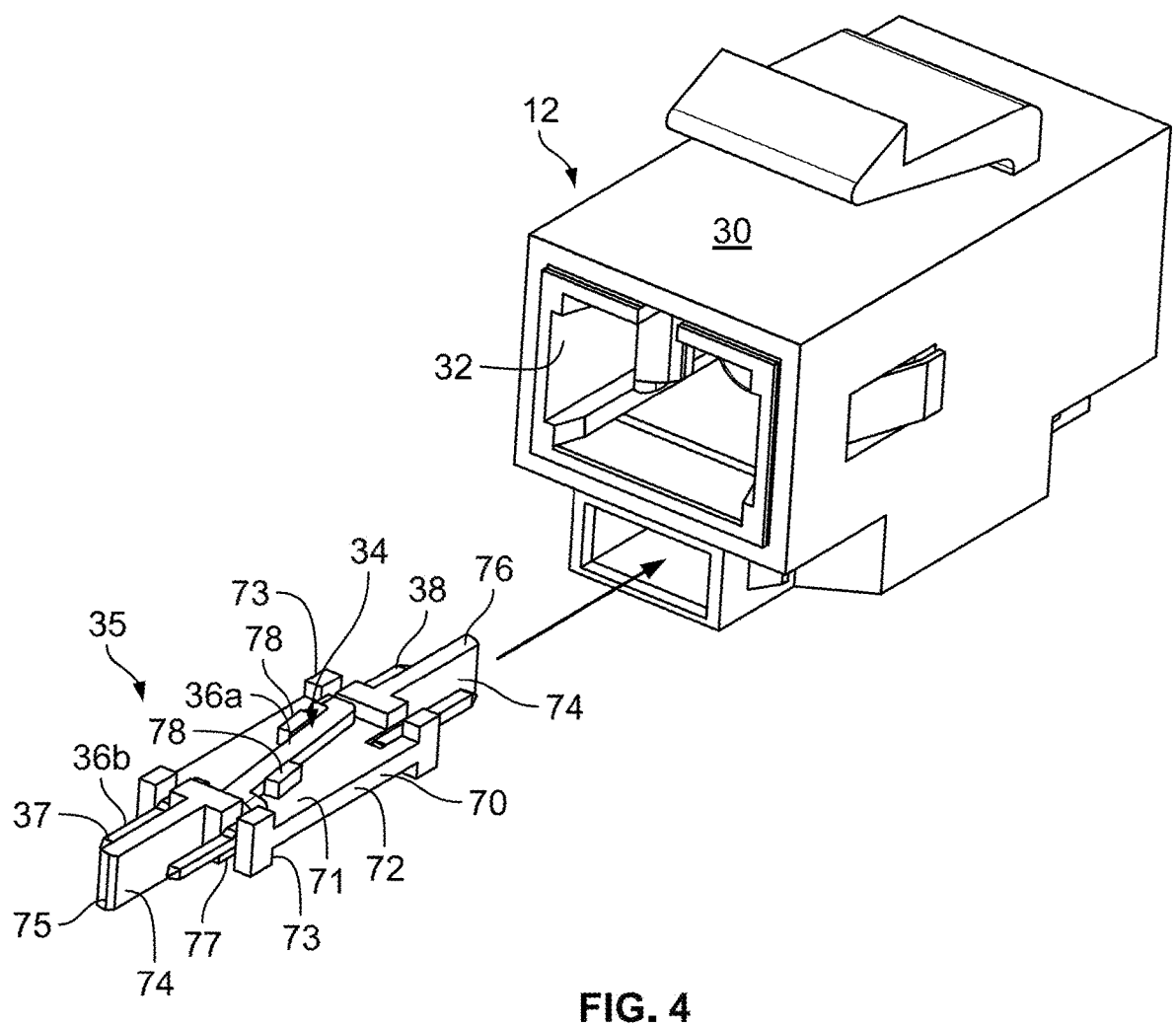
FIG. 4 is a perspective view of one variation of the polarity switching hybrid interface, including a variation of a pin insert and an electric coupling device, according to the present disclosure.

Referring to now to FIG. 4, the polarity switching hybrid interface 12 generally comprises a housing 30, a fiber optic coupling device 32, and an electrical coupling device 34

Figure 5A:
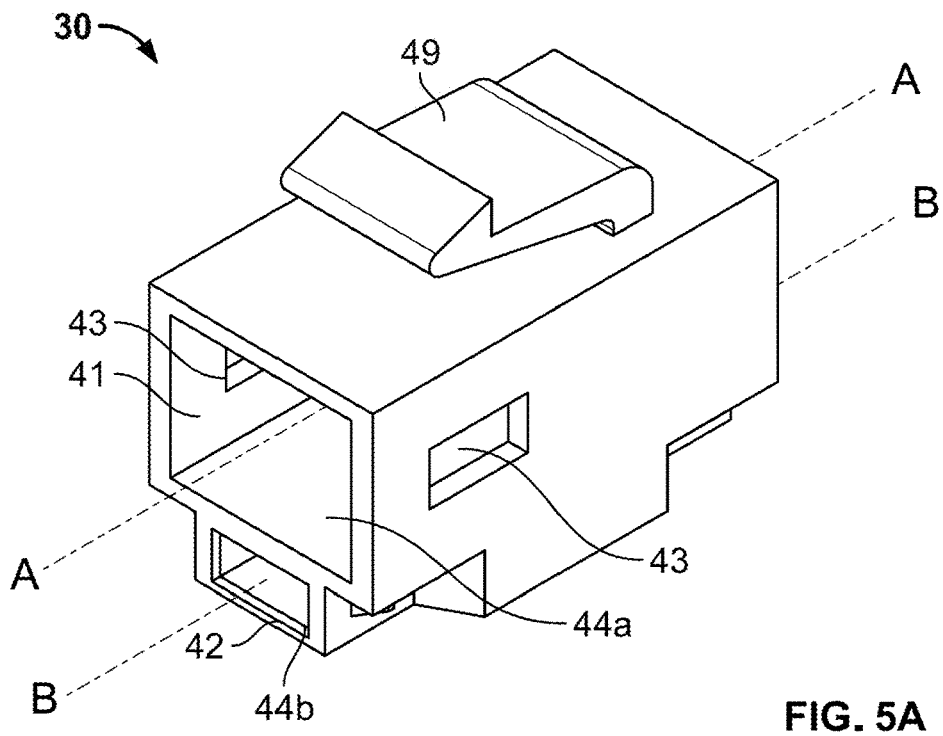
FIG. 5A is a perspective view of one variation of the housing of the polarity switching hybrid interface.

A first example embodiment of the housing 30 of the polarity switching hybrid interface 12 is illustrated in FIG. 5A. As shown, the housing 30 is of a unitary configuration having a first port or channel 41 extending there through on a first elongate axis A and a second port or channel 42 extending there through along a second, parallel elongate axis B. The first channel 41 is configured to accommodate the fiber optic coupling device 32 (see FIGS. 4 and 6) and includes side latch openings 43 on two sides of the housing 30. The second channel 42 is configured to accommodate the electrical coupling device 34. The second channel 42 is immediately proximate the first channel 41, is of a smaller cross-section than first channel 41, and has an inner profile 44a that can be the same as or different from the inner profile 44b of the first channel 41.

Figure 5B:
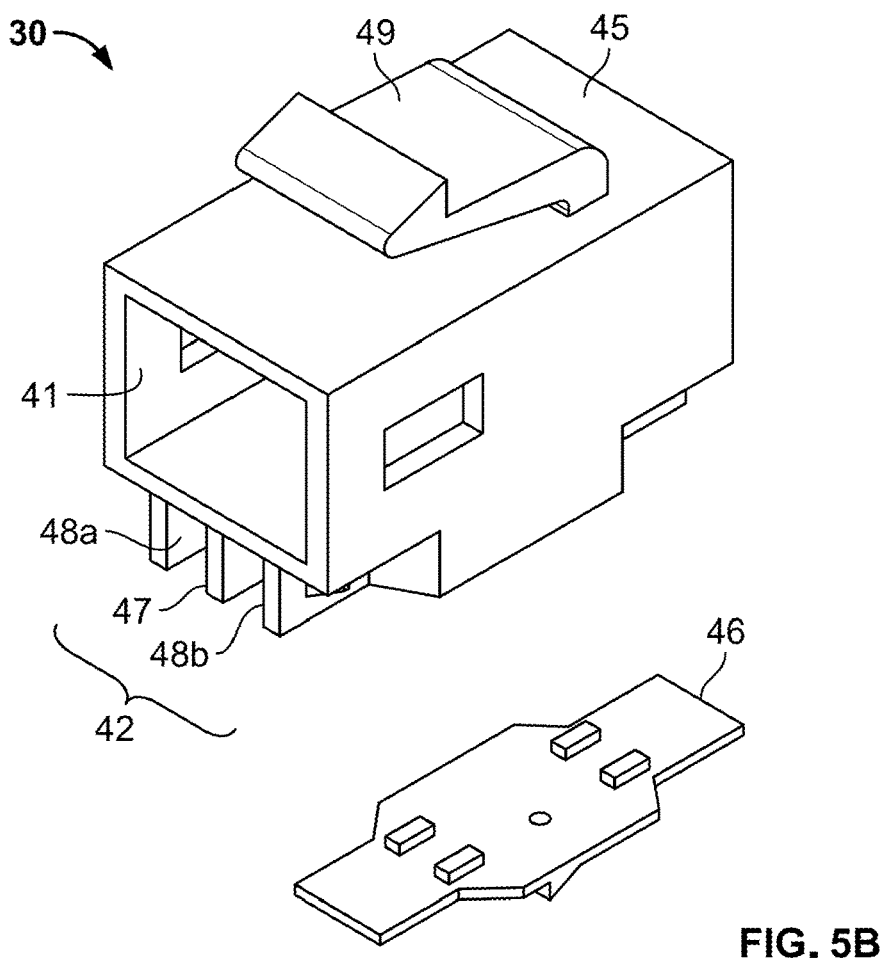
FIG. 5B is a perspective view of another variation of the housing of the polarity switching hybrid interface.

A second example embodiment of the housing 30 is illustrated in FIG. 5B. As shown, the housing 30 of this embodiment is of a multi-piece configuration including a body portion 45 and an end plate 46 configured to interface with the body portion 45. The body portion 45 incorporates first and second channels 41, 42, respectively. However, in this embodiment the second channel 42 is provided with an open face 47. The end plate 46 is configured to cover the open face 47 and, when secured to the body portion 45, completes the housing 30. The second channel 42 can be singular in nature, as shown in FIG. 5A, or a divided channel having a side channel 48a and a side channel 48b.

Each of the housings 30 in FIGS. 5A and 5B can include a stop latch 49 that enables the polarity switching hybrid interface 12 to interface with the wall plate 14 and prevent the polarity switching hybrid interface 12 from being pushed through the port 18 of the wall plate 14.

Figure 6A:
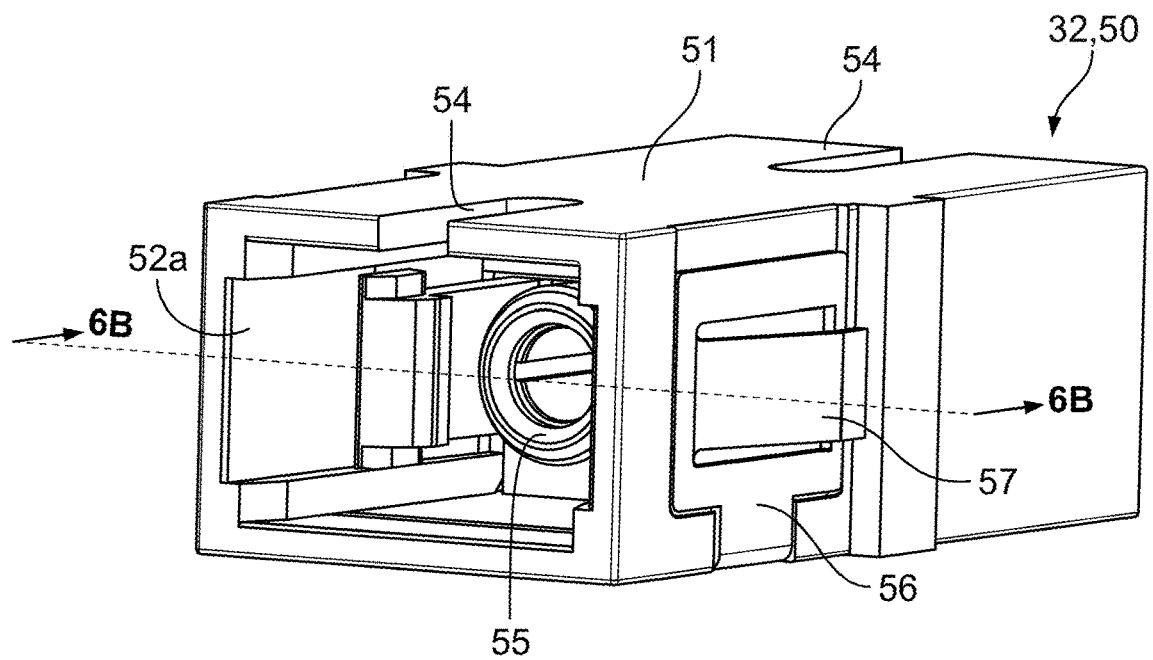
FIG. 6A is a perspective view of a fiber optic coupling device configured to interface with the polarity switching hybrid interface.
Figure 6B:
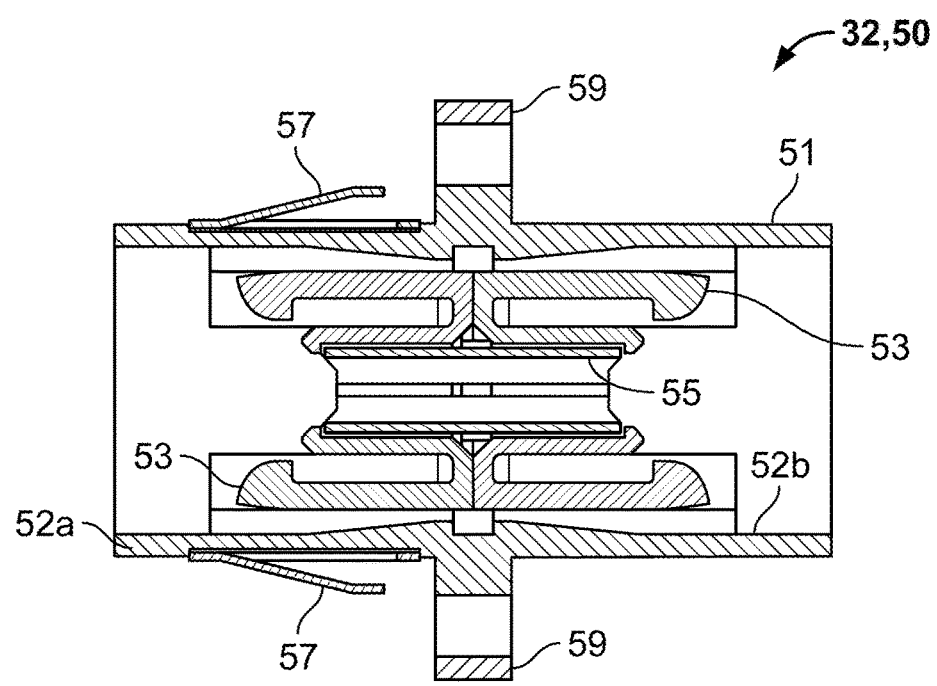
FIG. 6B is cross-sectional view of the fiber optical coupling device taken along ling 6B-6B of FIG. 6A.

Referring to FIGS. 6A and 6B, the fiber optic coupling device 32 of the polarity switching hybrid interface 12 generally comprises a fiber optic adapter 50 such as an SC-type fiber optic adapter presenting an optical connection interface; however, other types of fiber optical adapters can be used. The fiber optic adapter 50 comprises an adapter body 51 that defines a first port 52a for receiving a first fiber optic connector 112 (see FIG. 14) and a similar oppositely positioned second port 52b for receiving a second fiber optic connector 112. The adapter body 51 can define keying slots 54 configured to receive keying rails of the first and second fiber optic connectors 112, and can also include internal latches 53 for latching the first and second fiber optic connectors 112 in their respective ports 52a, 52b. The fiber optic adapter 50 further includes an alignment structure 55 to align the optical fibers extending from the first and second connectors 112. The fiber optic adapter 50 also includes a band 56 that provides snap-fit latches 57 at two sides of the adapter body 51; the snap fit latches 57 are provided near an external shoulder 59 of the adapter body 51. The snap-fit latches 57 are configured to interface with side latch openings 43 of the housing 30 upon sliding the fiber optic adapter 50 into the housing 30. In various alternative embodiments, the housing 30 is over molded over the adapter body 51 eliminating the need for side latch openings 43 and snap-fit latches 57.

In certain examples, the alignment structure 55 of the fiber optic coupling device 32 is adapted for aligning optical fibers of ferruled connectors while in other examples the alignment structure 55 is adapted for aligning optical fibers of ferrule-less connectors. Information about ferruled connectors can be found in WO 2016/123124, entitled "Optical Fiber Connection System Including Optical Fiber Alignment Device"; the entire content of the noted application is hereby incorporated by reference. Information about ferrule-less connectors can be found in WO 2013/117598; the entire content of the noted application is hereby incorporated by reference. In certain examples, the alignment structure 55 can be adapted for aligning single fiber connectors while in other examples the alignment structure 55 can be adapted for aligning multi-fiber connectors.

While the above describes a fiber optical coupling device 32 configured to accommodate an SC connector, in certain examples, the fiber optic coupling device 32 can be configured to accommodate one or more of an SC connector, an LC connector and/or an MPO connector.

Referring once again to FIG. 4, the electrical coupling device 34 is illustrated. The electrical coupling device 34 generally includes electrical circuitry that comprises a pair of electrically conductive, coupling pins 36a and 36b having first contact ends 37 and second contact ends 38. In this example the coupling pins 36a, 36b are maintained within a pin insert 35. The pin insert 35 includes a central plate 70 have a first face 71 and a second face 72. Corner stabilizers 73 are provided at each corner of the central plate 70 and centrally positioned, elongate stabilizers 74 are provided at a first end 75 and a second end 76 of the central plate 70. Slots 77 lie intermediate the corner stabilizers 73 and the elongate stabilizers 74 to position and retain the first and second ends 37, 38 of the coupling pins 36a, 36b. A pair of positioning tabs 78 extend outward from both the first face 71 and second face 72 of the central plate 70 to define a stabilizing path for positioning and retaining the coupling pins 36a and 36b. The coupling pins 36a and 36b can be press-fit into position at the slots 77 and positioning tabs 78, and the pin insert 35 can be inserted into the second channel 42 of the housing 30 of the polarity switching hybrid interface 12; an interference fit maintains the pin insert 35 within the second channel 42. Alternatively, a snap-fit latch (not shown) or other type of retaining mechanism within the second channel 42 can maintain the position of the pin insert 35 within the second channel 42. The coupling pins 36a and 36b are provided in a cross configuration to maintain polarity in coupling the electrical wiring of the consumer cable 16 to the electrical wiring of the internal cabling 10 (see FIG. 1), e.g., the polarity at the first contact ends 37 is switched via the electrical circuitry to an opposite polarity at the second contact ends 38. Alternatively, the pin insert 35 can be configured to accommodate straight coupling pins for which the polarity may be corrected at the electrical connectors of the wiring.

Figure 7:
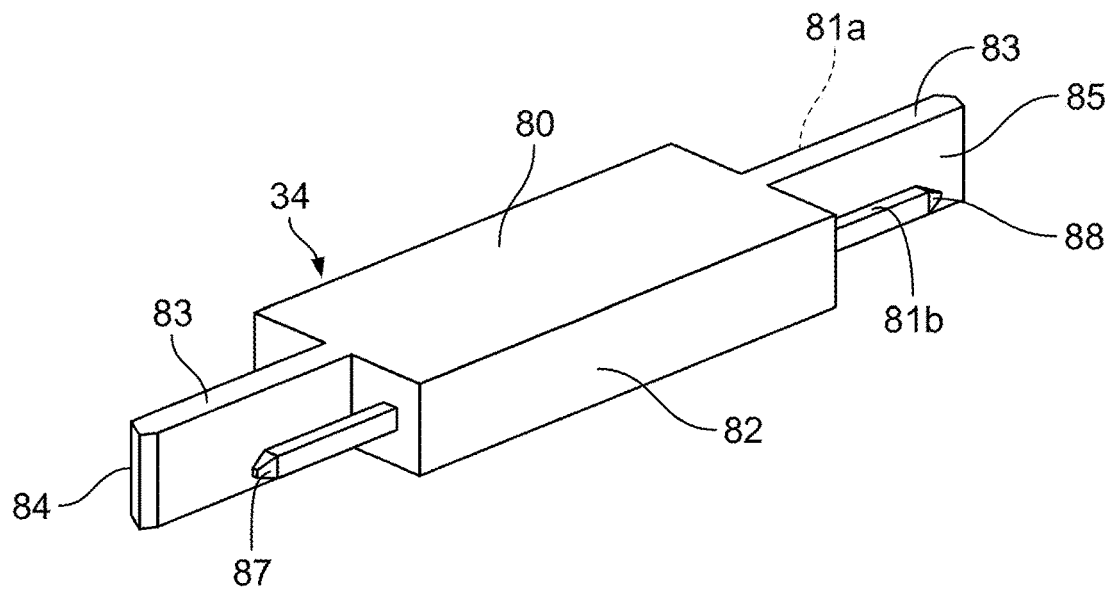
FIG. 7 is a perspective view of another variation of the pin insert and electric coupling device configured to interface with the polarity switching hybrid interface.

Referring now to FIG. 7, another example embodiment of the electrical coupling device 34 is illustrated. Similar to FIG. 3, the electrical coupling device of FIG. 7 generally comprises a pair of coupling pins 81a (hidden behind elongate stabilizer 83) and 81b; the coupling pins 81a, 81b are maintained within a pin insert 80. The pin insert 80 comprises a molded component having a central portion 82 and elongate stabilizers 83 at a first end 84 and a second end 85 of the pin insert 80. The coupling pins 81a and 81b can be molded within the pin insert 80 in a cross-configuration or a straight configuration. The pin insert 80 is configured to be inserted within the second channel 42 of the housing 30 and is maintained therein by an interference fit or retaining mechanism. Once again, the electrical circuitry of the coupling pins 81a and 81b performs the switching of polarity such that the polarity at the first contact ends 87 of the coupling pins 81a, 81b is opposite to the polarity at the second contact ends 88.

Figure 8:
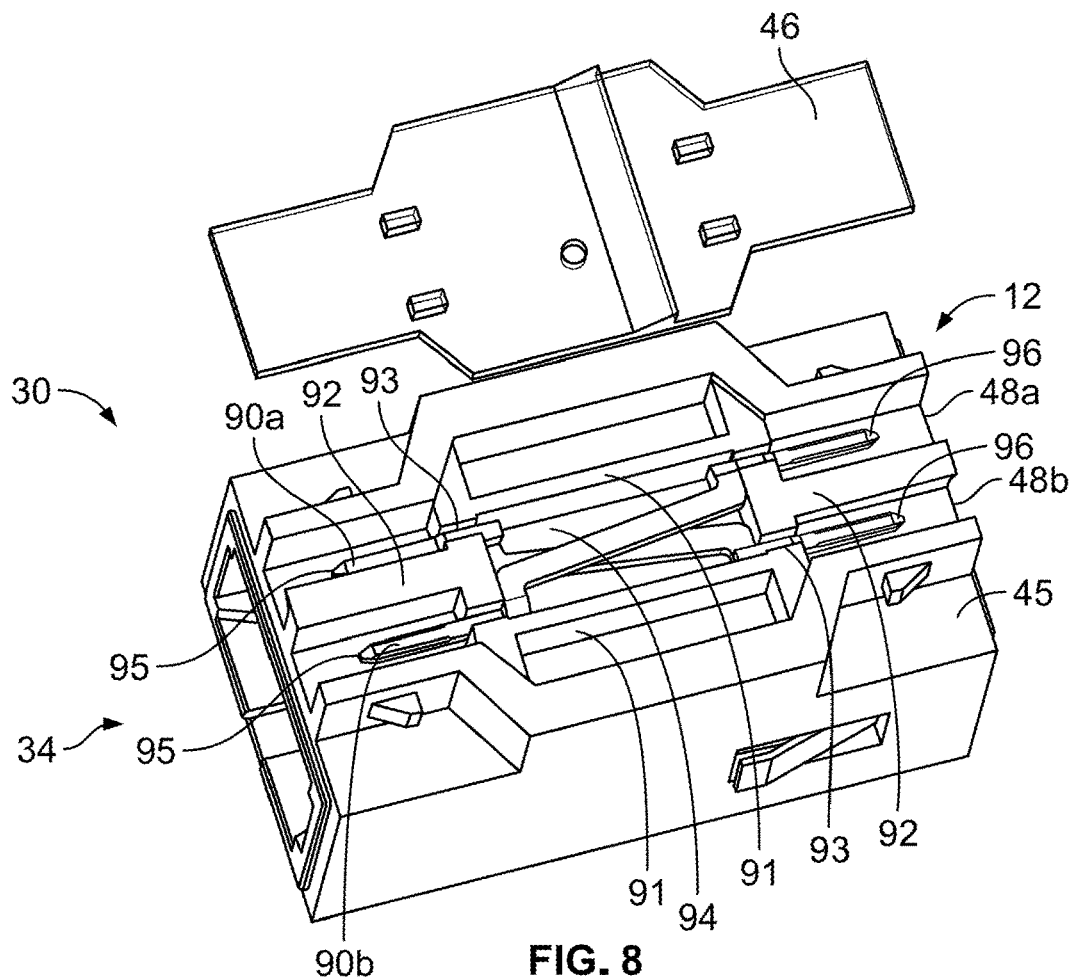
FIG. 8 is perspective view illustrating another variation of the electric coupling device in relation to the polarity switching hybrid interface.

Referring to FIG. 8, still another example embodiment of the electrical coupling device 34 is illustrated. This embodiment of the electrical coupling device 34 is configured to interface with the housing 30 of FIG. 5B that includes body portion 45, end plate 46 and a divided second channel 42 that includes side channels 48a and 48b. The electrical coupling device 34 comprises a pair of coupling pins 90a and 90b in cross configuration. The side channels 48a and 48b are modified to accommodate the cross configuration of the coupling pins 90a, 90b. More specifically, the side channels 48a and 48b include a pair of side walls 91 and a pair of central dividers 92 that operate in conjunction with the side walls 91 to establish four corner slots 93 and an open central portion 94. The corner slots 93 are configured to accommodate the first contact end 95 and the second contact end 96 of each of the coupling pins 90a, 90b; the coupling pins 90a, 90b can be press-fit into the appropriate positions. The space within the side channels 48a, 48b not occupied by the coupling pins 90a, 90b is left unfilled creating a dielectric air gap. The end plate 46 is snapped onto, or otherwise, secured to the body portion 45 after placement of the coupling pins 90a, 90b. The electrical circuitry of the electrical coupling device 34, e.g., the coupling pins 90a and 90b, performs the switching of polarity such that the polarity at the first contact ends 95 of the coupling pins 90a, 90b is opposite to the polarity at the second contact ends 96.

Figure 9:
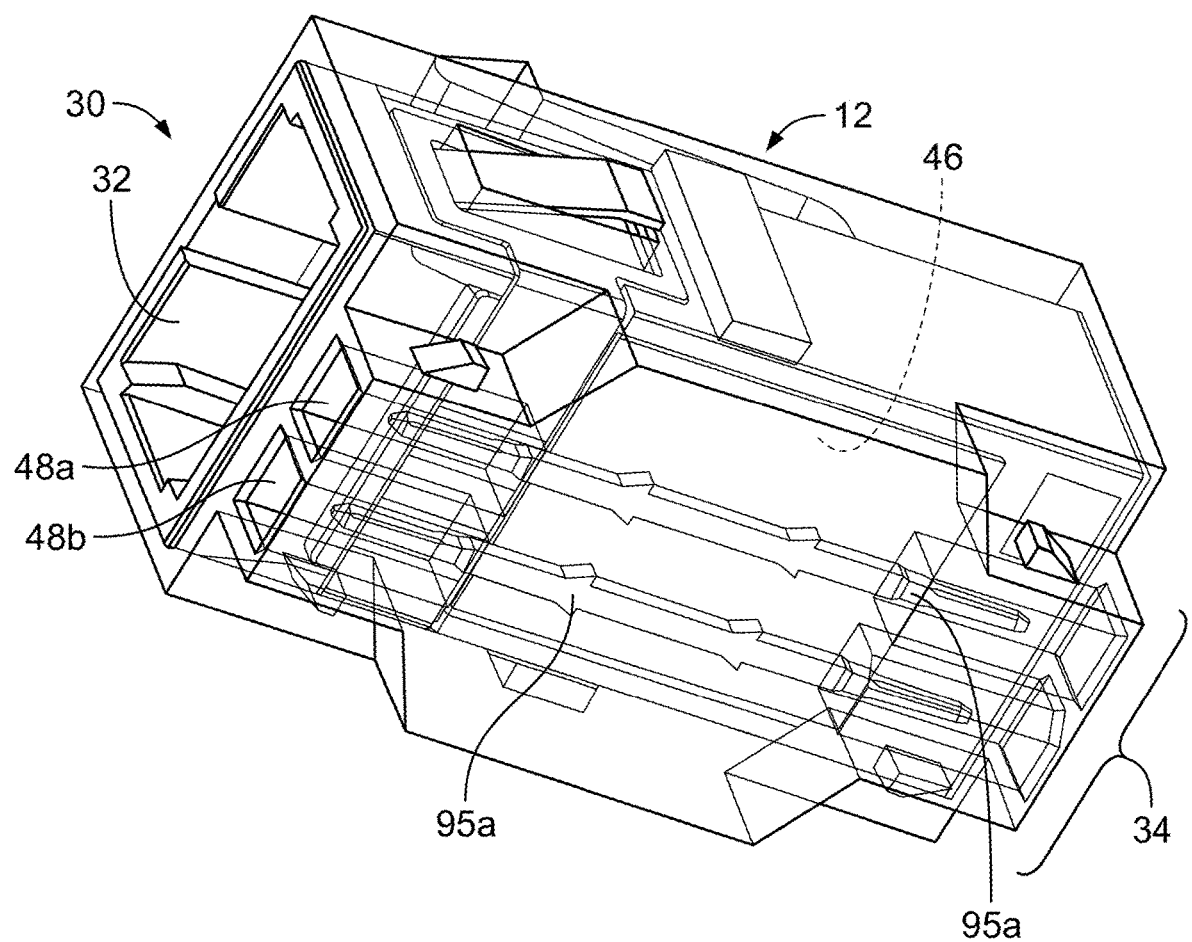
FIG. 9 is perspective view illustrating another variation of the electric coupling device in relation to the polarity switching hybrid interface.

Referring to FIG. 9, another example embodiment of the electrical coupling device 34 is illustrated. Again, this embodiment of the coupling device is configured to interface with the housing 30 of FIG. 5B that includes body portion 45, end plate 46, and the divided second channel 42 that includes side channels 48a and 48b. In this embodiment, the electrical coupling device 34 includes electrical circuitry in the form of a pair of straight coupling pins 95a and 95b. The side channels 48a, 48b are configured to accommodate the straight coupling pins 95a, 95b with press-fit retention. Once again, the space within the side channels 48a, 48b not occupied by the straight coupling pins 95a, 95b is left unfilled creating a dielectric air gap; the end plate 46 conceals the straight coupling pins 95a, 95b upon being secured to the body portion 45 of the housing 30.

Figure 10:
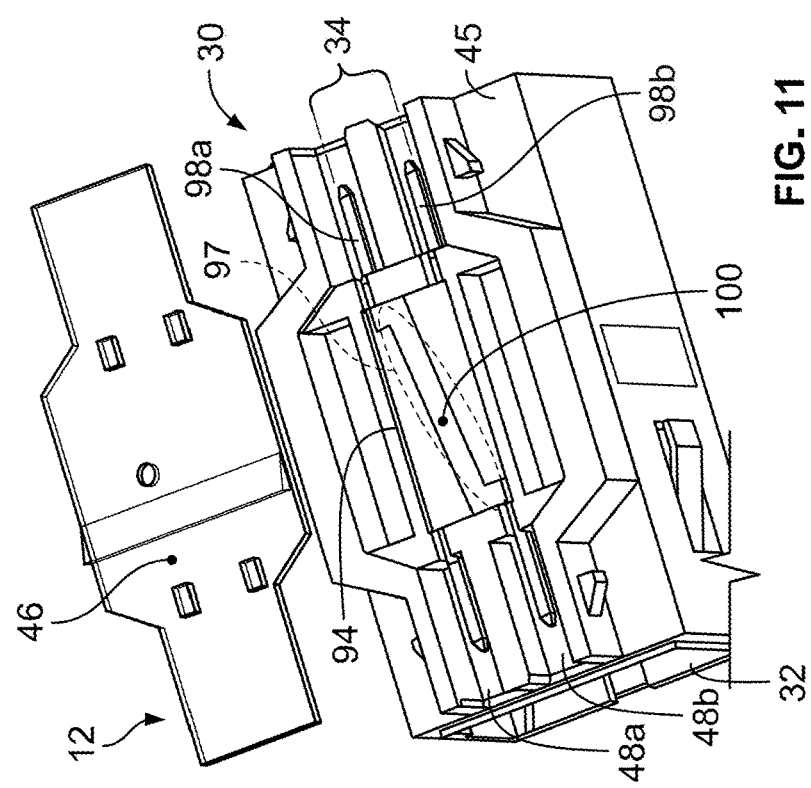
FIG. 10 is perspective view illustrating another variation of the electric coupling device in relation to the polarity switching hybrid interface.

Referring to FIG. 10, another example embodiment of the electrical coupling device 34 is illustrated. Again, this embodiment of the electrical coupling device 34 is configured to interface with the housing 30 of FIG. 5B that includes body portion 45, end plate 46, and the divided second channel 42 that includes side channels 48a and 48b. In this embodiment, the electrical coupling device 34 includes electrical circuitry in the form of a pair of coupling pins 98a, 98b in a cross configuration for polarity switching (or a straight configuration if polarity switching is not desired) with an epoxy resin 99 covering the coupling pins 98a, 98b in the central portion 94 of the side channels 48a, 48b. The epoxy resin 99 can comprise a dielectric or non-dielectric material. In an alternative embodiment, the central portion 97 of each of the coupling pins 98a, 98b that resides within the central portion 94 of the side channels 48a, 48b is individually taped or coated with a conformal coating.

Figure 11:
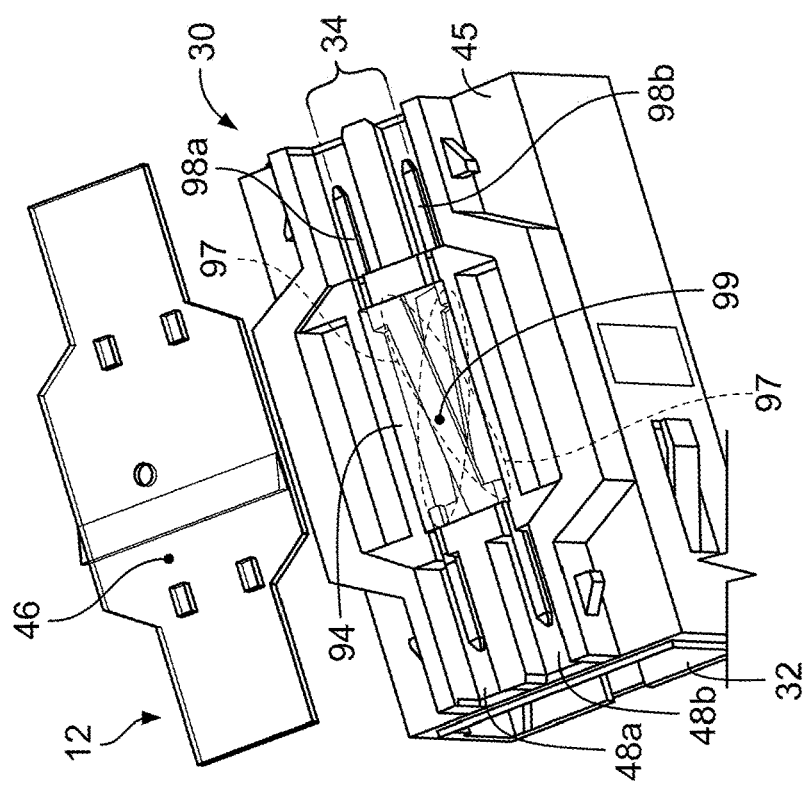
FIG. 11 is perspective view illustrating another variation of the electric coupling device in relation to the polarity switching hybrid interface.

In certain examples, see FIG. 11, the central portions 97 the coupling pins 98a, 98b are molded together producing a molded component 100 that is insertable within the central portion 94 of the side channels 48a, 48b. In each of the noted embodiments, the end plate 46 conceals the coupling pins 98a, 98b upon being secured to the body portion 45 of the housing 30.

Figure 12:
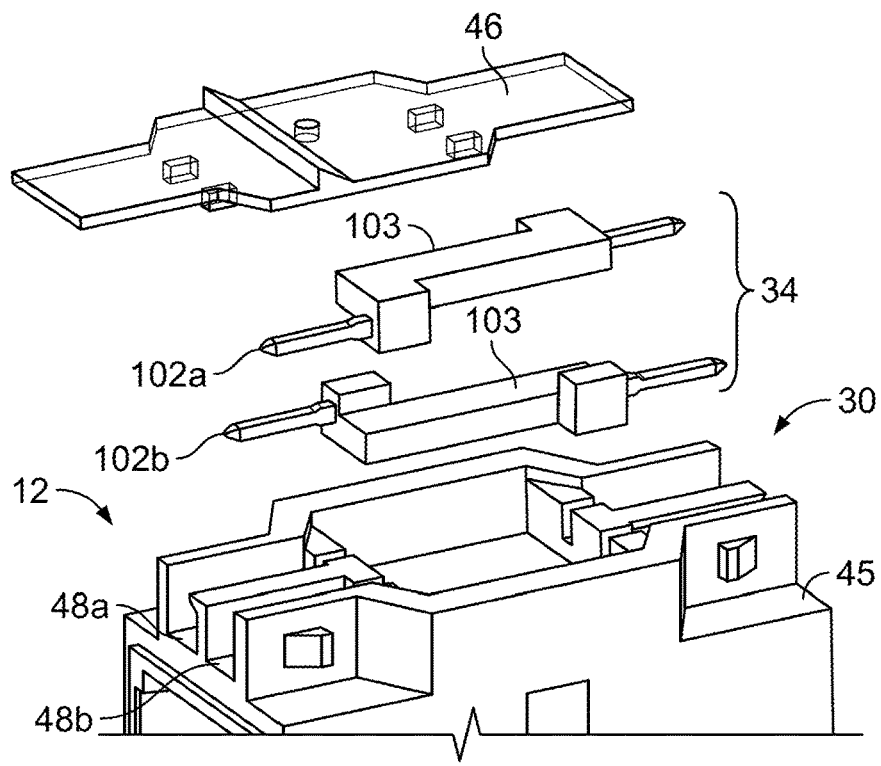
FIG. 12 is perspective view illustrating another variation of the electric coupling device in relation to the polarity switching hybrid interface.

FIG. 12 illustrates yet another embodiment of the electrical coupling device 34 wherein the electrical circuitry in the form of the coupling pins 102a, 102b in a cross configuration for polarity switching (or straight configuration if polarity switching is not desired) is individually over molded with a body portion 103 in a configuration to be accommodated by the side channels 48a, 48b. Once again, the end plate 46 conceals the coupling pins 102a, 102b upon being secured to the body portion 45 of the housing 30.

Figure 13:
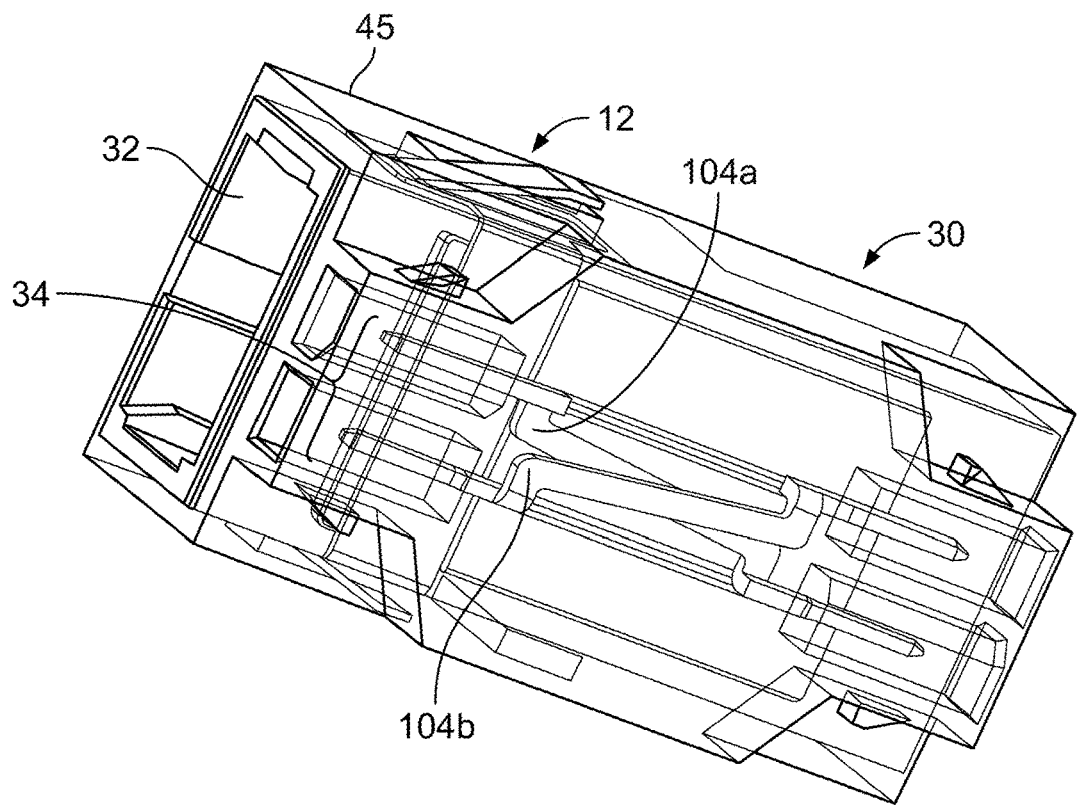
FIG. 13 is perspective view illustrating another variation of the electric coupling device in relation to the polarity switching hybrid interface.

FIG. 13 illustrates still another embodiment of the electrical coupling device 34. In this instance the electrical circuitry of the electrical coupling device 34 comprises a pair of coupling pins 104a, 104b in a cross configuration for polarity switching (or a straight configuration if polarity switching is not desired). In this instance both the fiber optic coupling device 32 and the electrical coupling device 34 are over molded by the housing 30 of the polarity switching hybrid interface 12 such that the fiber optic coupling device 32 and the electrical coupling device 34 are embedded within the housing 30. However, creating a mold to accommodate the fiber optic coupling device 32 and the electrical coupling device 34 adds significant complexity to the housing 30 of the polarity switching hybrid interface 12.

As described with reference to FIG. 1, the polarity switching hybrid interface 12 can be designed to interface with the wall plate 14 to provide a stationary receptacle at the wall 15 for fiber optic and electrical coupling. A consumer cable 16, carrying both optical fiber and electrical wiring via combined or separate cables, is coupled to one side of the polarity switching hybrid interface 12 while internal cabling 10, carrying both optical fiber and electrical wiring via combined or separate cables, is coupled to the opposite side of the polarity switching hybrid interface 12. Each of the cables 10 and 16 can be connectorized as illustrated in FIG. 14, and described herein, to enable the polarity switching hybrid interface coupling.

Figure 14:
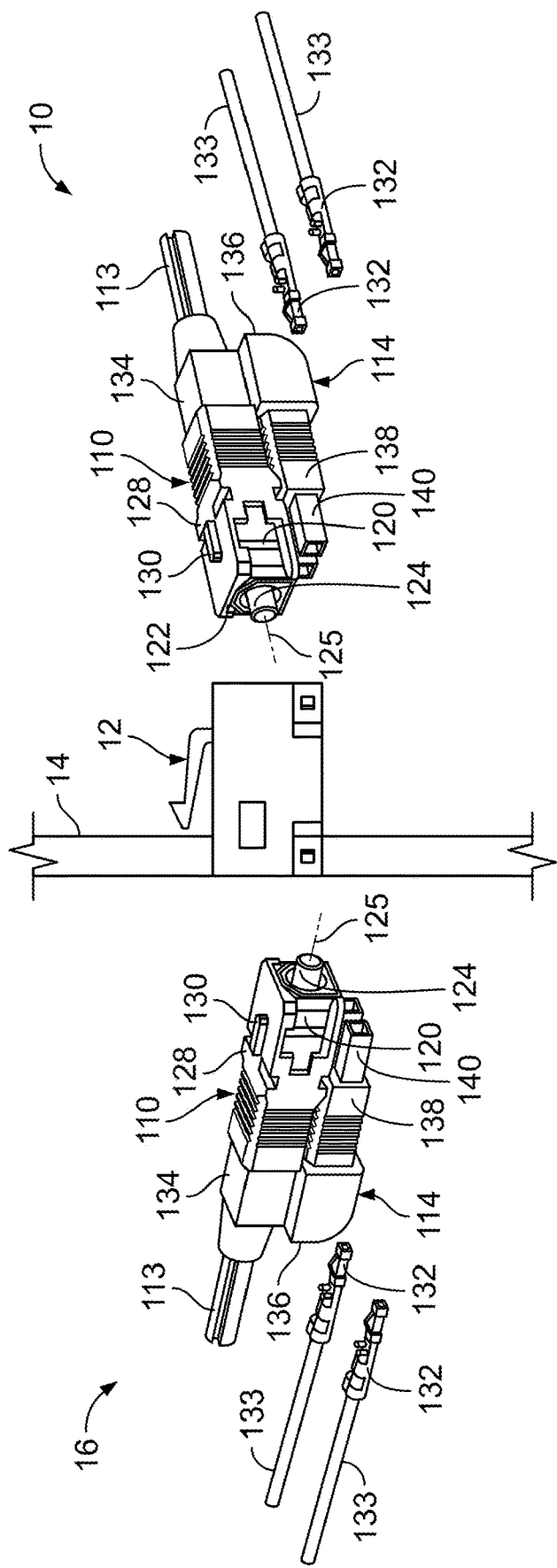
FIG. 14 is an illustration of a combined optical fiber and electrical connector in relation to the polarity switching hybrid interface.

Referring to FIG. 14, each of the cables 10 and 16, includes a connector 110 that comprises a fiber optic connector 112 that terminates the fiber optic cable 113 of cables 10 and 16, and an connector contact holder 114 that supports the electrical contacts 132 of the electrical wiring 133 of the cables 10 and 16. The fiber optic connector 112 generally comprises a connector body 120, e.g., an SC-type connector body, defining a forward plug end 122. A ferrule 124 is mounted within the connector body 120 and a spring (not shown) biases the ferrule 124 in a forward direction relative to the connector body 120. A rear piece (hidden by attachment portion 134) is secured to a rear end of the connector body 120 and functions to retain the spring within the connector body 120. The ferrule 124 defines a central passage for receiving an optical fiber 125 of the cable 10 or 16 to which the fiber optic connector 112 is terminated. The fiber optic connector 112 further includes an outer release sleeve 128 on which keying rails 130 can be provided.

Connector electrical contacts 132, e.g., sockets connected to electrical wiring 133 and capable of being coupled to the various coupling pins described above, are coupled to the fiber optic connector 112 by the connector contact holder 114 that attaches to the fiber optic connector 112. The connector contact holder 114 includes an attachment portion 134 that attaches to the fiber optic connector 112, a lateral offset portion 136 that extends laterally outwardly from the fiber optic connector 112 and a forward extension structure 138 that projects forwardly from the lateral offset portion 136 toward the forward plug end 122 of the connector body 120 of the fiber optic connector 112. The forward extension structure 138 can include contact mounts 140. In various example embodiments, the connector contact mounts 140 can include sleeves in which the connector electrical contacts 132 can be mounted. In various example embodiments, the connector electrical contacts 132 can be secured within the connector contact mounts 140 by a press-fit connection or other type of connection.

In operation, with the polarity switching hybrid interface 12 secured within the wall plate 14, each of the connectors 110 can be coupled to the polarity switching hybrid interface 12. Each of the optical fibers 125 of the fiber optic connectors 112 is inserted into the fiber optic coupling device 32 and axially aligned. Further, as the optical fibers 125 are inserted, the pins comprising the electrical coupling device 34 are received within the connector contact holder 114 and electrically coupled to the connector electrical contacts 132. Accordingly, both fiber optic coupling and electrical coupling are achieved through use of a polarity switching hybrid interface 12 in a minimal amount space, e.g., the space occupied by the form factor of an RJ-45 connector.

Additional information regarding the connector 110 and variation thereof can be found in PCT Publication WO 2016/123124, the entire contents of which is hereby incorporated by reference.

While the above disclosure, has described the polarity switching hybrid interface 12 in relation to a consumer setting, e.g. a wall plate, it should be noted that the polarity switching hybrid interface 12 is equally useful in any other setting (e.g., telecommunications systems, industrial systems, etc.) that benefits from a polarity switching interface that can provide both optical coupling and electrical coupling. In certain embodiments, a plurality of the polarity switching hybrid interfaces 12 are grouped in a common location, e.g., panel mounting, an interface bank, etc., where the concentration of polarity switching hybrid interfaces 12 can help to simplify optical fiber and electrical conductor routing. Each polarity switching hybrid interface 12 helps to simplify the architecture of optical fiber and electrical conductor routing as an installer need not worry about the polarity of their electrical conductors prior to coupling with the polarity switching hybrid interface 12, e.g. the necessary switching of polarity will be performed by the interface 12 itself. Further, while the polarity switching hybrid interface 12 has been described as occupying the same amount of space as an RJ-45 receptacle, in certain embodiments the polarity switching hybrid interface 12 is of larger or smaller dimensions, and/or takes up more or less space than an RJ-45 receptacle.

The above disclosure has generally described the use of electrically conductive pins as the electrical circuitry that is used to perform the polarity switching at the interface 12. However, it should be noted that other types of electrical circuitry capable of performing the same or similar function, e.g. a printed circuit board or other electronic or electrical components, can be used. Further, while the above disclosure describes an interface 12 that is configured to accept the same connectors, e.g. the connectors of FIG. 14, at each of side of the interface 12, the interface 12 can also be configured to accept a first type of connector on one side and a second type of connector, which is different from the first, on its other side. Further still, the polarity switching interface 12 can be configured to accept a ferruled optical connector or a ferrule-less optical connector that is in hybrid form with the electrical connector, or is distinct (e.g., separate) from the electrical connector.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. A hybrid optical/electrical interface device comprising:
a housing;
a fiber optic coupler; and
an electrical conductor coupler having a first pair of electrical contacts electrically coupled to a second pair of electrical contacts,
wherein the fiber optical coupler and the electrical conductor coupler define a first side of the housing with a first fiber optic/electrical hybrid connector receiving-receptacle and define the second side of the housing with a second same fiber optic/electrical hybrid connector receiving-receptacle, wherein the electrical conductor coupler includes circuitry that changes a polarity at the first pair of contacts to an opposite polarity at the second pair of contacts.

2. The device of claim 1, wherein the housing is of a unitary configuration.

3. The device of claim 1, wherein the housing is of a multi-piece configuration.

4. The device of claim 1, wherein the fiber optic coupler comprises an SC adapter.

5. The device of claim 1, wherein the circuitry comprises a pair of electrically conductive pins.

6. The device of claim 5, wherein the electrically conductive pins are configured to be press-fit within the housing.

7. The device of claim 5, wherein the electrically conductive pins are maintained within a pin insert that is housed within housing.

8. The device of claim 7, wherein the electrically conductive pins are press-fit into the pin insert.

9. The device of claim 7, wherein the electrically conductive pins are molded into the pin insert.

10. The device of claim 5, wherein the electrically conductive pins are secured within the housing with an epoxy material.

11. The device of claim 5, wherein each of the electrically conductive pins includes its own molded body portion.

12. The device of claim 1, wherein the housing has a form factor consistent with an RJ-45 wall plate connector.

13. A coupling device comprising:
a housing having a first channel and a second channel;
a fiber optic coupling device contained within the first channel of the housing; and
an electrical coupling device contained with the second channel of the housing, wherein the electrical coupling device includes a first pair of contacts electrically coupled to a second pair of contacts, and wherein the electrical coupling device includes circuitry that changes a polarity at the first pair of contacts to an opposite polarity at the second pair of contacts.

14. The device of claim 13, wherein the housing is of a unitary configuration.

15. The device of claim 13, wherein the housing is of a multi-piece configuration.

16. The device of claim 13, wherein the fiber optic coupling device comprises an SC adapter.

17. The device of claim 13, wherein the electrical coupling device comprises a pair of electrically conductive pins.

18. A telecommunications connection system comprising:
a panel defining a plurality of ports; and
mounted within each port, hybrid optical/electrical interface device comprising:
a housing;
a fiber optic coupler; and
an electrical conductor coupler having a first pair of electrical contacts electrically coupled to a second pair of electrical contacts,
wherein the fiber optic coupler and the electrical conductor coupler define a first side of the housing with a first fiber optic/electrical hybrid connector receiving-receptacle and define the second side of the housing with a second same fiber optic/electrical hybrid connector receiving-receptacle, wherein the electrical conductor coupler includes circuitry that changes a polarity at the first pair of contacts to an opposite polarity at the second pair of contacts.

19. The telecommunications connection system of claim 18, wherein the fiber optic coupler includes an optical fiber alignment structure.

20. The telecommunications connection system of claim 19, wherein the alignment structure is adapted for aligning optical fibers of ferruled connectors or optical fibers or ferrule-less connectors.

21. The telecommunications connection system of claim 18, wherein the fiber optic coupler includes a ferrule alignment sleeve for aligning ferrules of optical connectors.

22. The telecommunications connection system of claim 18, wherein the fiber optic coupler includes a port having a form factor compatible with a fiber optic connector.

23. The telecommunications connection system of claim 22, wherein the fiber optic connector is a single fiber connector or a multi-fiber connector.

24. The telecommunications connection system of claim 22, wherein the fiber optic connector is an SC connector, an LC connector or an MPO connector.

25. A method of coupling a first optical/electrical hybrid connector to a second same optical/electrical hybrid connector, the first and second hybrid connectors coupled to respective optical/electrical hybrid cables, the optical/electrical hybrid cables each including an optical fiber and a pair of electrical conductors the method comprising:
receiving the first hybrid connector into a first optical/electrical hybrid receptacle of a housing;
receiving the second hybrid connector in a second optical/electrical hybrid receptacle of a housing, the first and second hybrid receptacles being both optically coupled and electrically coupled to one another, wherein the electrical coupling changes an electrical polarity of the first optical/electrical hybrid receptacle to an opposite electrical polarity at the second optical/electrical hybrid receptacle.

* * * * *